(12) United States Patent  (10) Patent No.: US 8,092,112 B2
Borgman et al.  (45) Date of Patent: Jan. 10, 2012

(54) DOWEL ASSEMBLY FOR A FURNITURE SYSTEM

(75) Inventors: Randall Borgman, Holland, MI (US); David Koning, Holland, MI (US); Brent Kunzi, Hudsonville, MI (US); Shane Kuipers, Hamilton, MI (US)

(73) Assignee: Haworth, Inc., Holland, MI (US)

( * ) Notice: Subject to any disclaimer, the term of this patent is extended or adjusted under 35 U.S.C. 154(b) by 293 days.

(21) Appl. No.: 12/317,076

(22) Filed: Dec. 18, 2008

(65) Prior Publication Data

US 2009/0162141 A1 Jun. 25, 2009

Related U.S. Application Data

(60) Provisional application No. 61/008,017, filed on Dec. 18, 2007.

(51) Int. Cl.
*F16B 12/00* (2006.01)

(52) U.S. Cl. ........ 403/231; 403/257; 403/259; 403/260; 403/DIG. 10; 312/111; 312/265.5

(58) Field of Classification Search .................. 403/231, 403/256, 257, 258, 259, 260, 261, 403, 409.1, 403/DIG. 10, DIG. 12, DIG. 13; 411/103, 411/104; 108/193, 153.1, 158.12, 157.16, 108/157.17; 312/108, 111, 257.1, 265.5, 312/265.6

See application file for complete search history.

(56) References Cited

U.S. PATENT DOCUMENTS

| 1,097,185 | A | * | 5/1914 | Oehrle ......................... 403/343 |
| 3,008,368 | A | * | 11/1961 | Hammitt et al. .............. 411/368 |
| 3,410,584 | A | * | 11/1968 | Bus ............................. 403/409.1 |
| 5,141,357 | A | * | 8/1992 | Sherman et al. ........... 403/409.1 |
| 5,480,253 | A | | 1/1996 | Ljungberg |
| 6,200,059 | B1 | | 3/2001 | Sawdon et al. |
| 6,250,032 | B1 | | 6/2001 | Davis et al. |
| 6,748,997 | B2 | | 6/2004 | Fricano et al. |
| 6,890,043 | B2 | | 5/2005 | Haworth et al. |
| 7,037,027 | B2 | | 5/2006 | Steinbeck |
| 2005/0069382 | A1 | | 3/2005 | Atwater et al. |

FOREIGN PATENT DOCUMENTS

GB  2 039 659  *  8/1980

* cited by examiner

*Primary Examiner* — Michael P Ferguson

(74) *Attorney, Agent, or Firm* — Flynn, Thiel, Boutell & Tanis, P.C.

(57) ABSTRACT

A dowel assembly for a furniture system provides a fastener usable in assembling various components in a furniture system. The dowel may be employed to define the relationship between first and second components of the furniture system, such as the relationship between adjoining planar surfaces of adjacent furniture panels. The dowel is fitted with a cam such that the cam provides a non-uniform radius at the interface between the dowel and one of the components. Through selective positioning of the cam about the longitudinal axis of the dowel, the interface between components of the furniture system may be selectively adjusted to ensure flush alignment of contiguous surfaces.

12 Claims, 14 Drawing Sheets

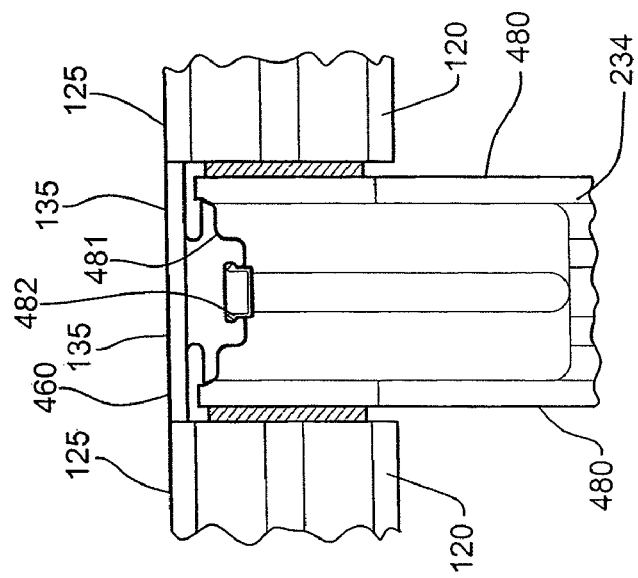
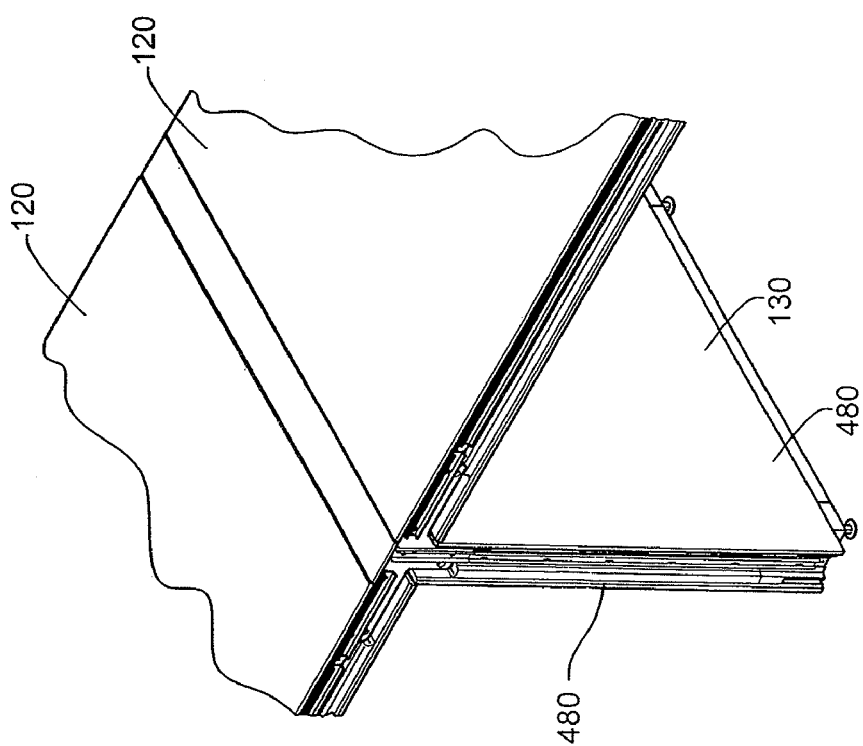
FIG. 5B
FIG. 5A

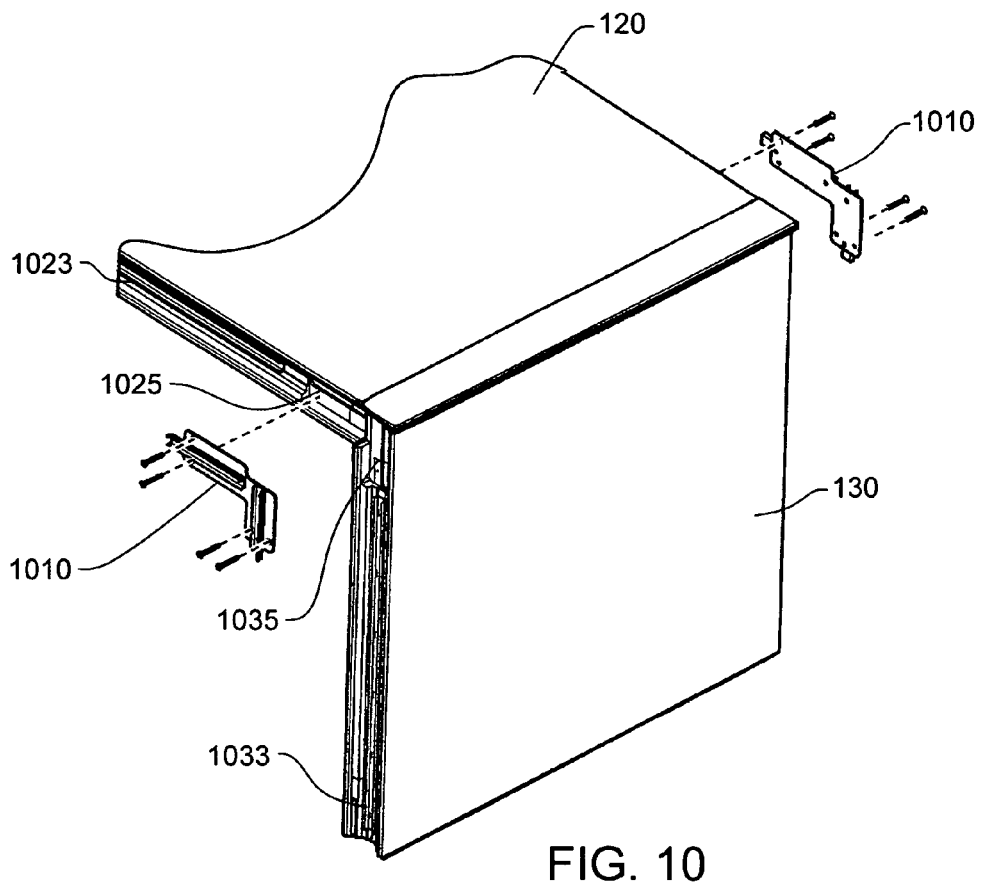
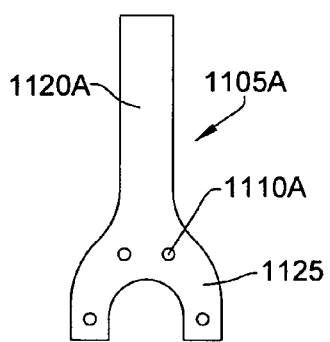
FIG. 11A
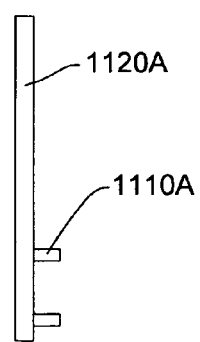
FIG. 11C
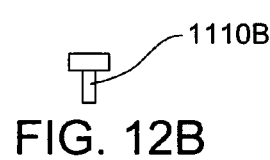
FIG. 12B
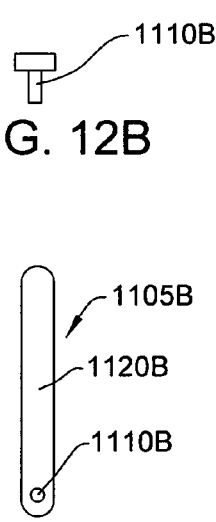
FIG. 12A    FIG. 12C
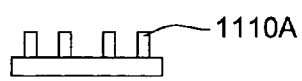
FIG. 11B FIG. 15
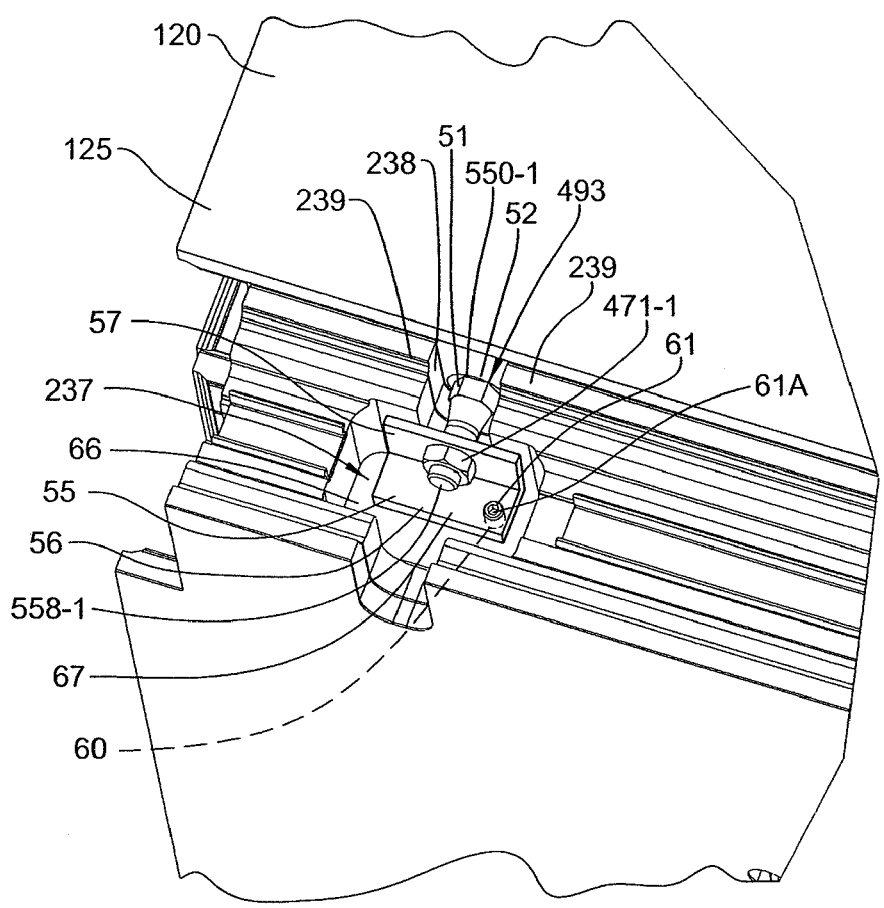
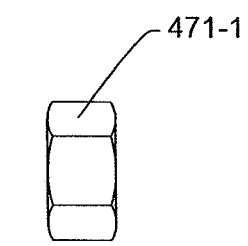
FIG. 16
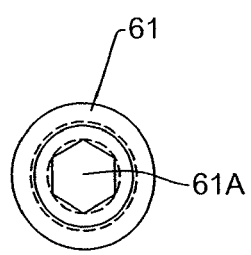
FIG. 17
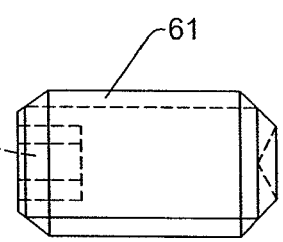
FIG. 18

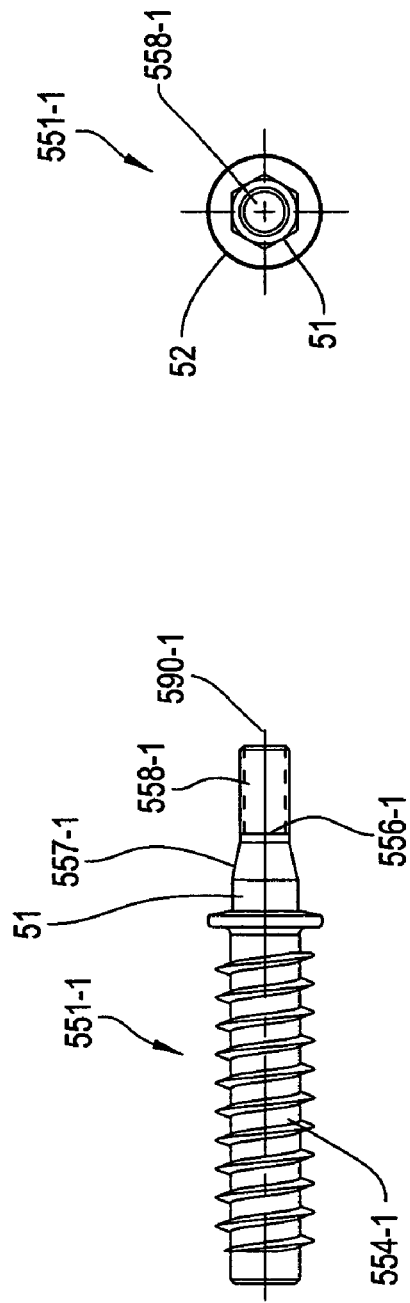
FIG. 19
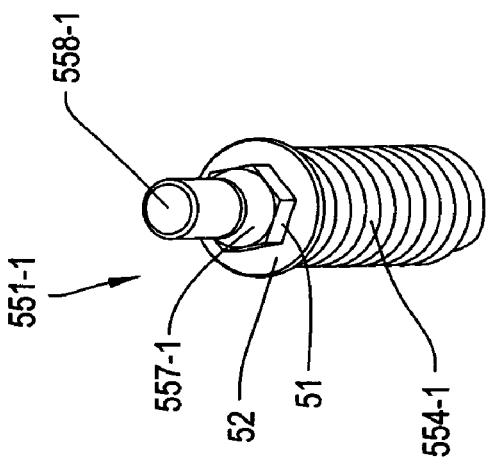
FIG. 20
FIG. 21

DOWEL ASSEMBLY FOR A FURNITURE SYSTEM

CROSS REFERENCE TO RELATED APPLICATION

This application claims the benefit of U.S. Provisional Application Ser. No. 61/008,017, filed Dec. 18, 2007, which is incorporated herein by reference in its entirety.

FIELD OF THE INVENTION

The invention relates to a dowel assembly for a furniture system provided with a cam having a non-uniform radius with respect to the longitudinal axis of the dowel.

BACKGROUND OF THE INVENTION

Furniture systems, such as benches, storage cabinets, desks, and the like, are generally formed from multiple components rather than hewn from a single piece of material. These multiple components are usually independently formed and then joined together to provide the furniture system. Methods of joining together such components include the use of fasteners, adhesives, pegs, brackets, pressure, etc.

One issue that frequently arises during the formation of such components relates to tolerances, that is, the accuracy with which the measurements of a given component correspond to those of an idealized component. For instance, furniture systems may require a great deal of precision at the interface between components in order to function properly. Inaccurate dimensions may lead to defects in appearance such as unwanted recesses or protuberances, wobble in the assembled structure, and unwanted stresses within the structural material.

The source of such dimensional problems may relate to a lack of quality control during the machining process and/or a requirement for a high degree of accuracy imposed by the design. For example, some designs require such accurate fitting between elements that even the smallest degradation of the machine tools may generate nonconforming components.

A second source of measurement-related problems may relate to assembly of the various components. Furniture systems may be assembled, disassembled, and rearranged multiple times once they enter the marketplace. In some designs, even the act of assembling and disassembling the furniture system may wear down components and generate problems relating to tolerances.

Accordingly, it is an object of the present invention to provide an improved apparatus and method for affixing components of a furniture system.

Specifically, a dowel assembly according to the present invention includes a cam having a non-uniform radius with respect to the longitudinal axis of the dowel. When inserted into the interface between adjoining components of the furniture system, the dowel assembly spans the interface, wherein the cam may be selectively rotated with respect to the surface of the dowel body to selectively adjust the position of one component relative to the adjacent component to accommodate interfaces having various dimensions.

More particularly, the dowel assembly of the invention has sufficient size and rigidity so as to span a joint between two adjacent furniture components, such as a horizontal cabinet panel and a vertical cabinet panel, to carry the weight of the panel and serve a load bearing function. Additionally, the aforementioned cam is disposed outwardly of one of the components but seats within a pocket in the other of the components wherein rotation of the cam effects displacement of one component relative to the other to selectively adjust the position of such components, such as to precisely align adjacent, contiguous surfaces on the two components, such as to align such contiguous surfaces in a flush, coplanar condition. Still further, the end of the dowel assembly opposite to the cam has a fastener formation such as threads which threadingly engage one component, while the opposite end of the dowel assembly also has fastener formations thereon, preferably a threaded shank with a washer and nut that can be tightened onto the other component and draw the two components together so that the dowel assembly serves a joining function. In this manner, a knock-down furniture system such as a knock-down cabinet, may have a refined fit between the components which more closely mimics high-end, custom built furniture.

Additionally, the invention relates to an adjustment system for precisely aligning adjacent furniture panels and components together. The system provides a plurality of the dowel assemblies at spaced locations along the interface between two adjacent components wherein the dowel assemblies are each independently adjustable relative to the other assemblies so that the degree of adjustment and displacement of one component relative to the other component may be precisely adjusted independently of the other dowel assemblies being provided thereon. The system of a plurality of adjustable dowel assemblies can result, for example, in a uniformly flush joint between contiguous surfaces even if the amount of required adjustment differs at the various dowel locations.

It will be appreciated that the dowel according to the invention may also be utilized in other types of structures which incorporate a dowel in joining components of a furniture system.

Other objects and purposes of the invention will be apparent to persons familiar with arrangements of this general type upon reading the following specification and inspecting the accompanying drawings.

BRIEF DESCRIPTION OF THE DRAWINGS

FIG. 5A is a partial isometric assembly view of the furniture system of the invention assembled using the inventive system of dowel assemblies;

FIG. 5B is a partial end view of contiguous top surfaces oriented flush to one another;

FIG. 10 is an isometric assembly view of a furniture system further affixed with brackets;

FIG. 11A, FIG. 11B, and FIG. 11C are orthographic projections of an embodiment for a tool for adjusting the position of a cam with respect to a dowel;

FIG. 12A, FIG. 12B, and FIG. 12C are orthographic projections of a second embodiment for a tool for adjusting the position of a cam with respect to a dowel;

FIG. 15 is an isometric view of a further embodiment of an adjustable dowel assembly;

FIG. 16 is a side view of a nut therefor;

FIG. 17 is a top view of a set screw;

FIG. 18 is a side view of the set screw;

FIG. 19 is a side view of a dowel body;

FIG. 20 is an end view of the dowel body;

FIG. 21 is an isometric view of the dowel body;

Figure 1:
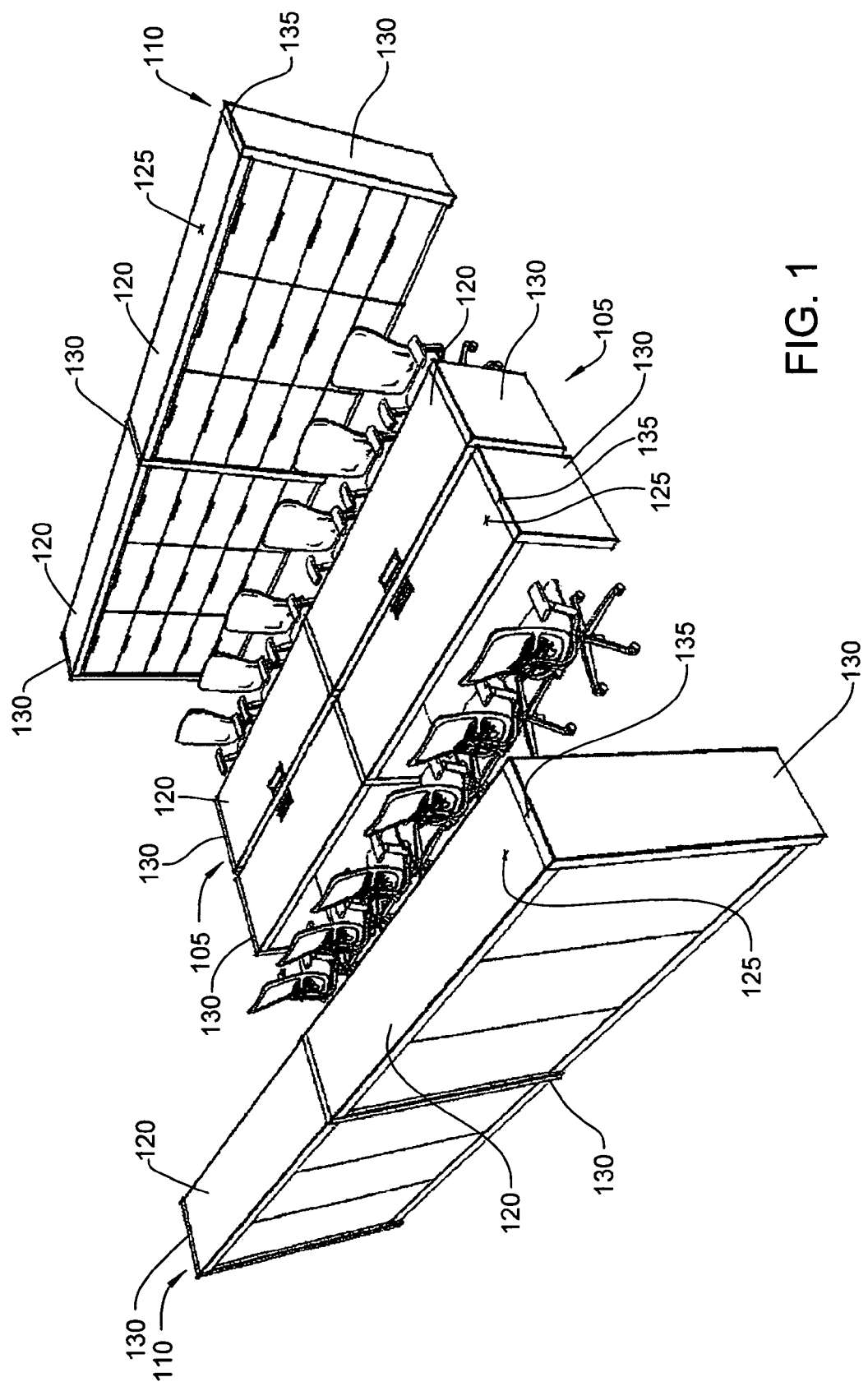
FIG. 1 is an isometric view which illustrates various types of furniture systems assembled using the system of dowel assemblies of the invention.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to FIG. 1, the furniture systems displayed here include desks 105 as well is storage cabinets 110. While functionally distinct, the desks 105 and storage cabinets 110 share a variety of features. For example, both the desks 105 and storage cabinets 110 feature at least one horizontal member 120 coupled to at least one vertical member 130 such that the vertical members 130 define the height of the horizontal member 120 relative to the floor. The horizontal members 120 are substantially the same as each other, while the vertical members 130 are similar in construction but have different heights.

Further, in both the desks 105 and the storage cabinets 110, the top surface 125 of the horizontal member 120 adjoins the vertical member 130 contiguously along the top edge face 135 of the vertical member 130. As a consequence, the top edge face 135 of the vertical member 130 preferably is substantially flush with the contiguous top surface 125 of the horizontal member. However, dimensional anomalies, such as those occurring during the manufacturing process, may reduce the likelihood of achieving this effect consistently.

Figure 2A:
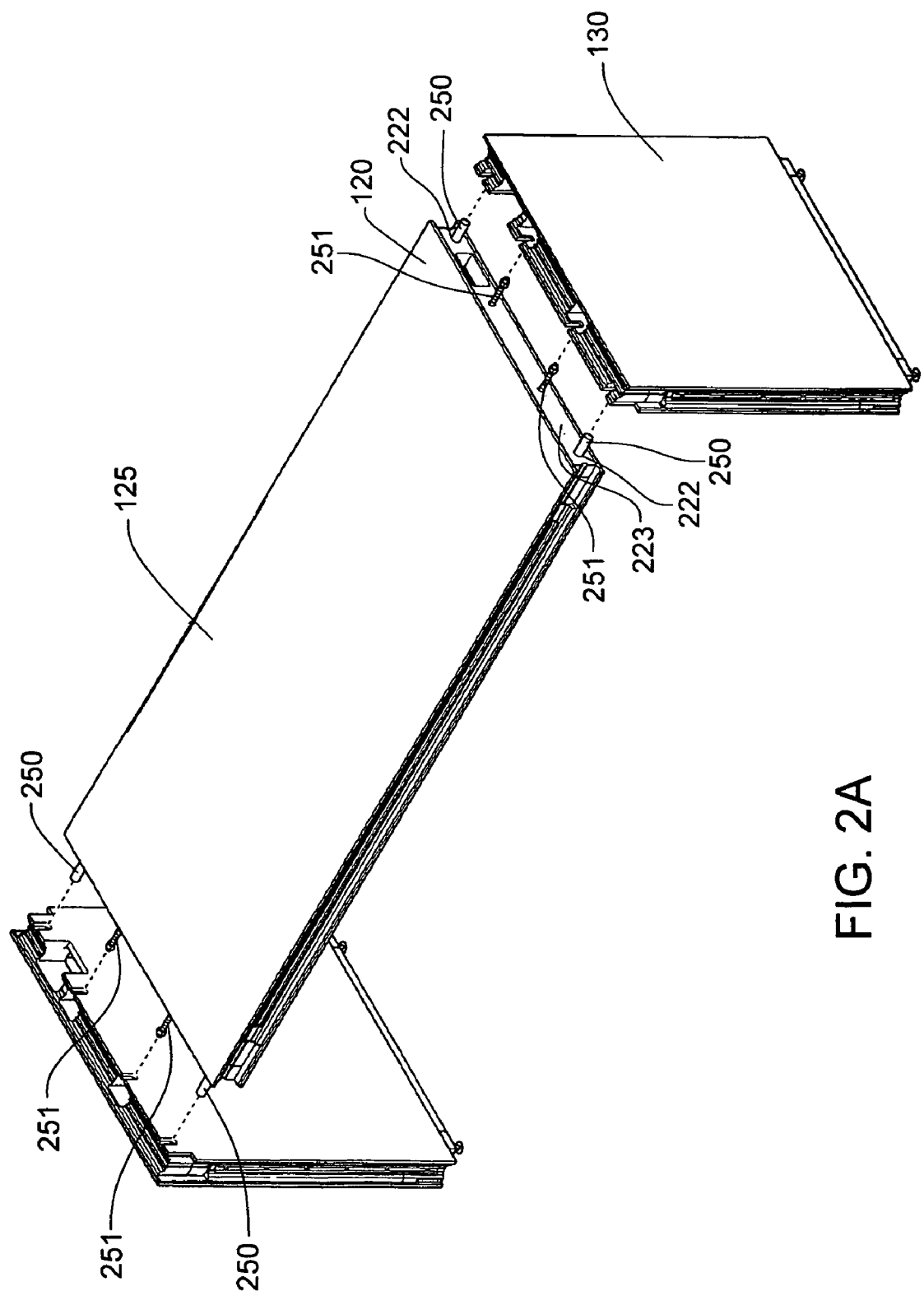
FIG. 2A is an isometric assembly view of a known furniture system.
Figure 2B:
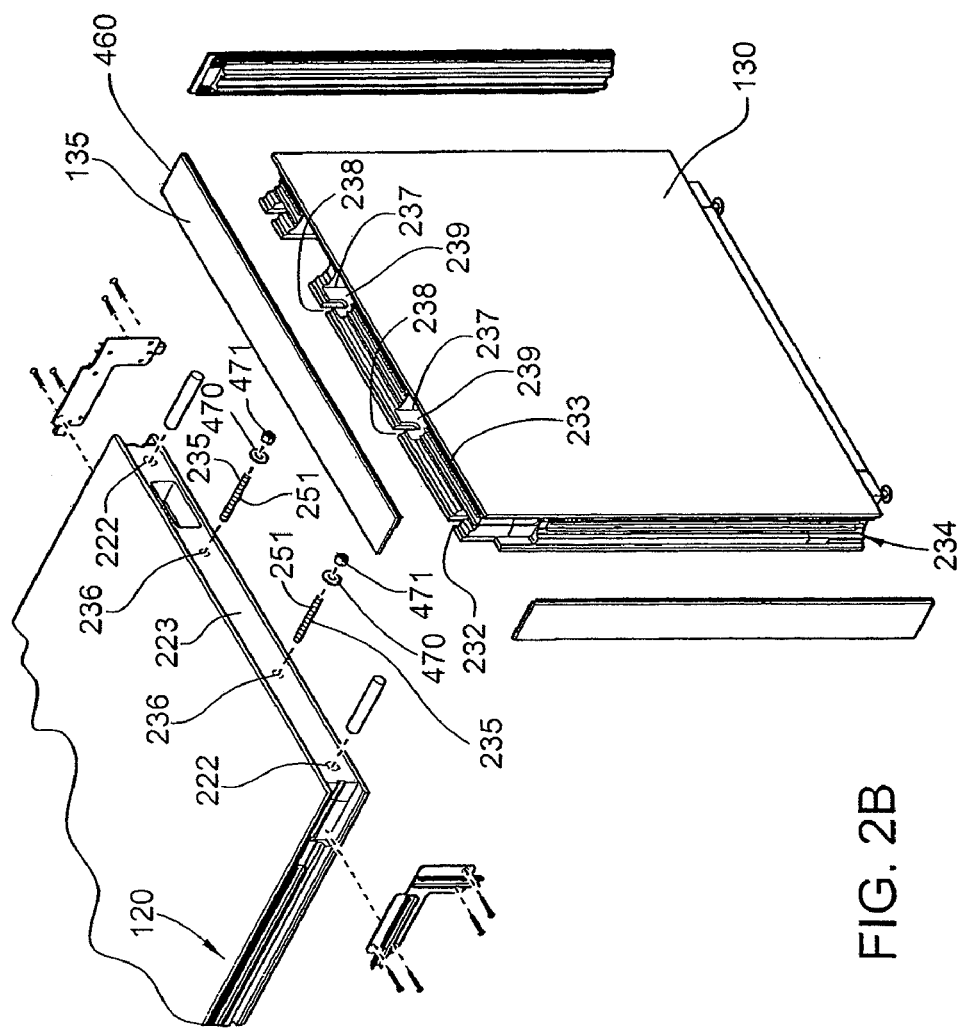
FIG. 2B is an exploded partial isometric assembly view of the known furniture system.

These difficulties are illustrated with specificity in the known furniture construction of FIGS. 2A and 2B, which figures provide isometric assembly views of a furniture system. As shown in the figures, the vertical member 130 couples to the horizontal member 120 via two rigid dowels 250 and two bolt assemblies 251. Each dowel 250 attaches to the horizontal member 120 within a dowel receiving bore 222 located along the joining surface 223 of the horizontal member 120. One end of the dowel 250 is affixed within the horizontal member 120. Further, the opposite, cantilevered, free end of each dowel 250 attaches to the vertical member 130 within a corresponding, upward opening slot 232 located within an end member 233 of an internal frame 234 of the vertical member 130. Once inserted into the slot 232, the dowel 250 slides downwardly into the slot 232 wherein the dowel 250 projects horizontally from the top panel joining surface 223 so that the cantilevered dowel 250 is supported on the bottom end of the slot 232 and carries the vertical weight of the horizontal panel 120. It is noted that the horizontal panels 120 in the preferred cabinet construction of FIG. 1 are disposed between the inside faces of the respective vertical panels 130 so that all of the vertical weight of the horizontal member 120 is carried by the dowels 250.

Figure 4A:
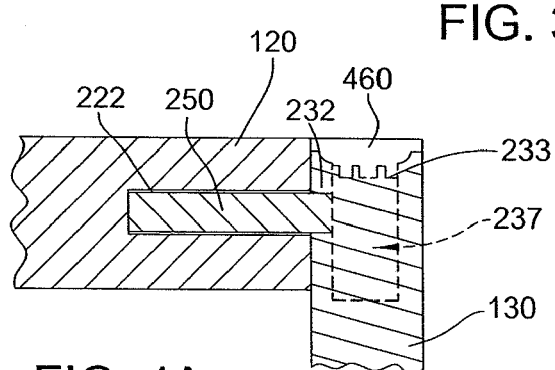
FIG. 4A, FIG. 4B, and FIG. 4C are cross-sectional side views illustrating the surface issues relating to dimensional constraints along the interface between a known, non-adjustable dowel and the components.
Figure 4B:
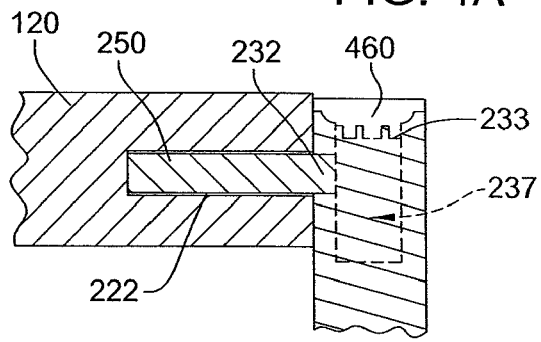
Figure 4C:
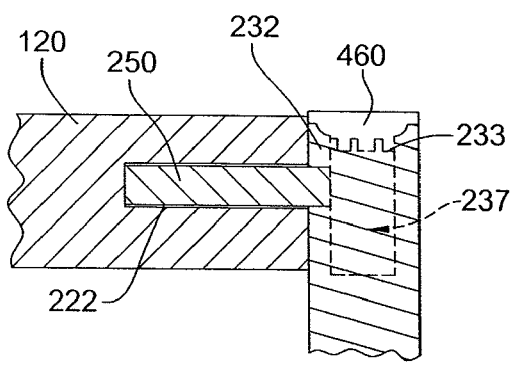

While the dowels 250 carry a vertical load, such dowels 250 do not join or draw the panels 120 and 130 sidewardly together as is required for rigid affixation of these components together. Hence, the aforementioned bolt assemblies 251 also are provided so as to project horizontally sidewardly from the top panel joining surface 223. The bolt assemblies 251 comprise a threaded rod 235 which is threadedly engaged into a corresponding threaded bore 236 formed in the top panel 120. This threaded rod 235 is configured to extend into an upward opening pocket-like recess 237 formed in the upper edge of the vertical panel 130. The recess 237 includes a vertically oriented upward opening slot 238 which allows for the threaded rod 251 to slide downwardly therein. The recess 237 is defined on one side by a recess side wall 239 in which the slot 238 is formed. The bolt assembly 251 further comprises a washer 470 and a nut 471 which engage the threaded shaft 235 interiorly within the recess 237 so that the recess wall 239 is sandwiched on the outside by the top panel end face 223 and on the inside by the washer 470 which is then pressed and clamps onto the side wall by tightening of the nut 471. In particular, the threaded shaft 235 is fastened within the recess 237, for example, by adjoining the washer 470 and tightening the nut 471 so as to bring the horizontal member 120 sidewardly closer to the vertical member 130. In this way, the horizontal member 130 is attached to the vertical member 130 via dowels 250 and bolt assemblies 251. In the present illustration, the top surface 135 of the vertical member 130 is defined by the top surface of an end cap 460 (FIG. 4A-C). This end cap 460 connects to the vertical member 130 within the end cap interface of the vertical member 130.

Figure 3A:
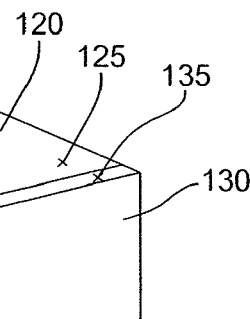
FIG. 3A, FIG. 3B, and FIG. 3C are isometric views illustrating surface issues relating to dimensional constraints along the interface between components.
Figure 3B:
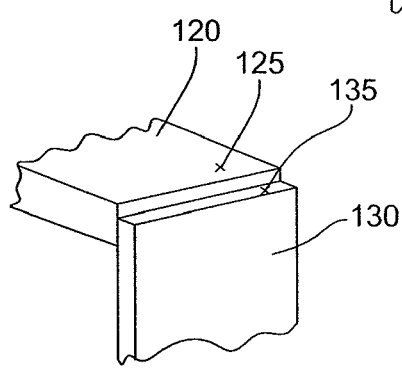
Figure 3C:
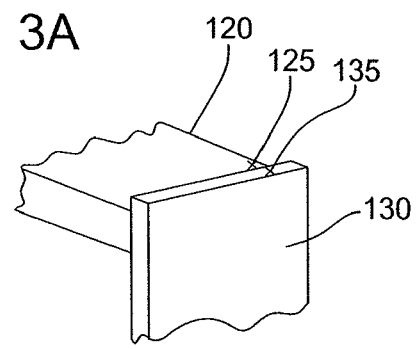

In order to achieve a substantially flush surface between the top surface 125 of the horizontal member 120 and the top surface 135 of the vertical member 130, it is required that the various elements of the known furniture system of FIG. 2A be dimensioned to a high degree of accuracy. For instance, the interface between the horizontal member 120 and the vertical member 130 is at least partially related to the interface between the dowels 250 and the slots 232. If the slot 232 extends too far downward from the horizontal member 120, the dowel 250 would cause the horizontal member 120 to rest too lowly with respect to the top of the vertical member 130 (see FIG. 3C and FIG. 4C). Alternatively, if the slot 232 does not extend sufficiently downward with respect to the horizontal member 120, the dowel 250 would cause the horizontal member 120 to rest too highly with respect to the top of the vertical member 130 (See FIG. 3B and FIG. 4B). Likewise, alignment errors may arise due to the interface between the dowel 250 and the dowel receiving bore 222.

Whether the top surface 125 of the horizontal member 120 and the top surface 135 of the vertical member 130 are "substantially flush" (see FIG. 3A and FIG. 4A) may be defined in various ways. For example, the design may specify a degree of allowable discontinuity between the top surface 125 of the horizontal member 120 and the top surface 135 of the vertical member 130. However, given that machining and sharpening inherently causes wearing of the cutting devices, it may be difficult to consistently and inexpensively manufacture components having acceptable dimensions according to the definition of "substantially flush".

Figure 5C:
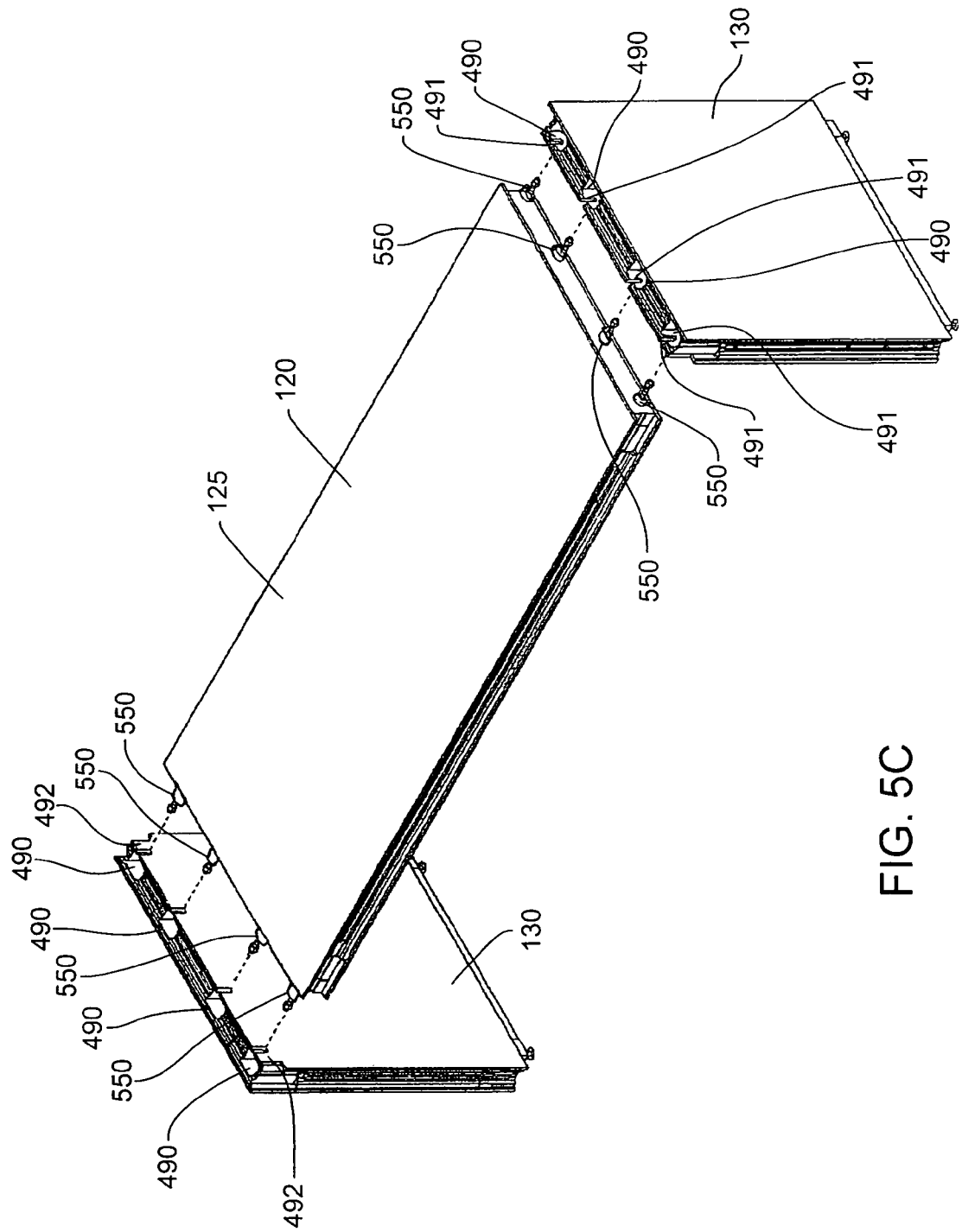
FIG. 5C is an exploded isometric view of the furniture system of the invention.

The method and apparatus of the invention of overcoming these types of difficulties is illustrated in FIGS. 5A-5C, which provide an isometric assembly view of a furniture system assembled using a system of inventive dowel assemblies 550.

Referring to FIGS. 5A, 5B and 5C, the furniture system includes a vertical member or panel 130 which rigidly supports the horizontal members or panels 120 which are suspended from the opposite panel side faces 480 of vertical panel 130. As seen in FIG. 5B, the internal frame 234 of the vertical panel includes an edge channel 481 in which the top cap 460 is snap-fitted by the retainer 482. Once the top cap 460 is snap-fit into position, the edge surface 135 lies contiguous and in the illustrated embodiment, disposed between the top surfaces 125 of the horizontal panels 120. It is noted that these various surfaces 125, 135, 480 and the other exposed surfaces of the furniture system have a desired aesthetic appearance that may vary but in many embodiments, has a wood appearance. To closely mimic the appearance of fine furniture, it is highly desirable to make the surfaces 135 and 125 as closely flush and coplanar as possible to each other. As previously mentioned, however, variations in manufacturing tolerances can result in the surfaces 125 and 135 being positioned with a more pronounced offset or non-flush condition which results in a less desirable fit and finish.

Figure 8:
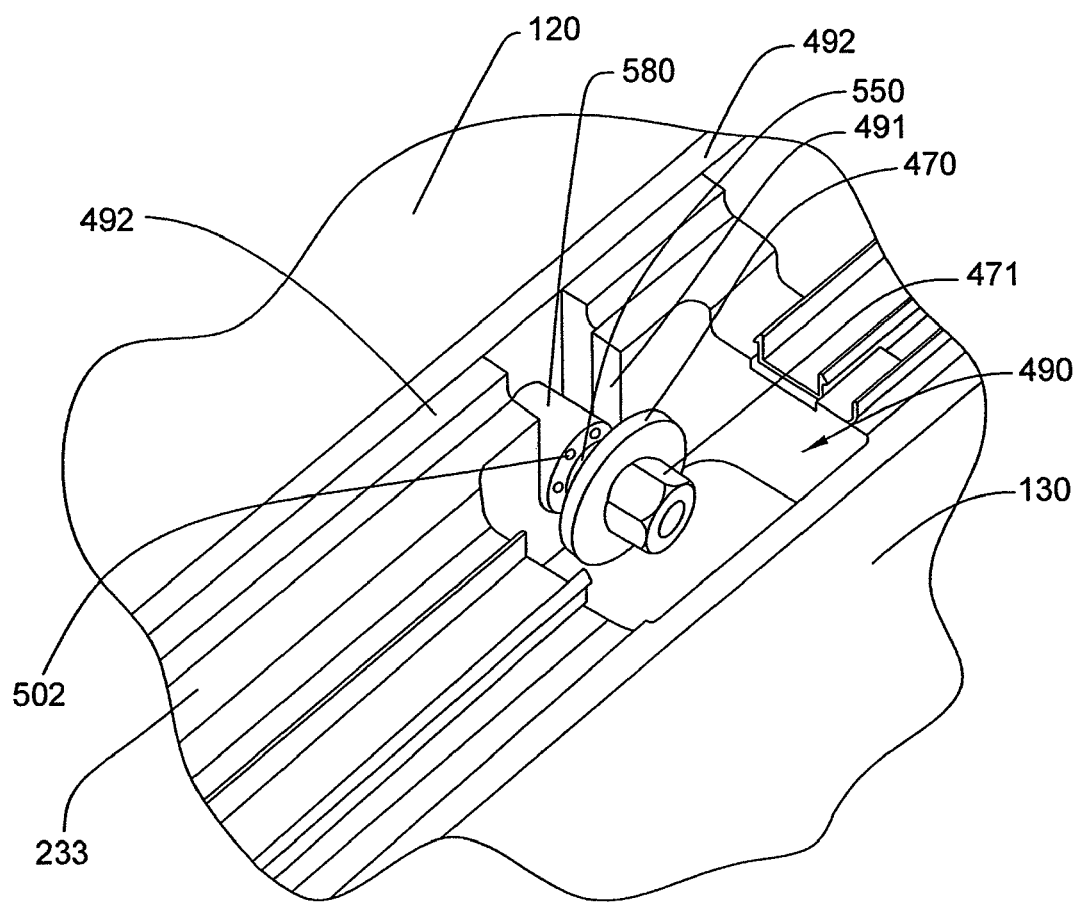
FIG. 8 is an isometric view of a dowel and a cam joining components of a furniture system.

Referring to FIG. 5C, the furniture system of the invention includes a system of adjustable dowel assemblies 550 which preferably are provided at spaced apart locations along the entire length of the end edges of the horizontal panel 120. Rather than providing the aforementioned dowels 250 and bolt assemblies 251, the inventive dowel assemblies 550 are provided preferably in all of the spaced end locations for cooperating engagement with the upper edges of the vertical panels 130. Preferably the upper edges of the vertical panels 130 include a plurality of pocket-like recesses 490 which each define a vertical slot 491 in the side wall 492 thereof (FIG. 8). As described hereinafter, these dowel assemblies 550 provide multiple functions wherein the dowel assemblies 550 support the vertical loads of the horizontal panels 120, have bolt features which draw the horizontal panel 120 and the vertical panels 130 sidewardly together, and also are adjustable to precisely adjust the relative position of the top cap 460 relative to the contiguous surfaces 125 to more precisely achieve the desired fit and finish between such surfaces. Further, the dowel assemblies 550 are provided as a system of a plurality of such assemblies 550 which are each independently adjustable one relative to the other so that dimensional variations across the front to back width of the horizontal panels 120 may also be accommodated.

Figure 6A:
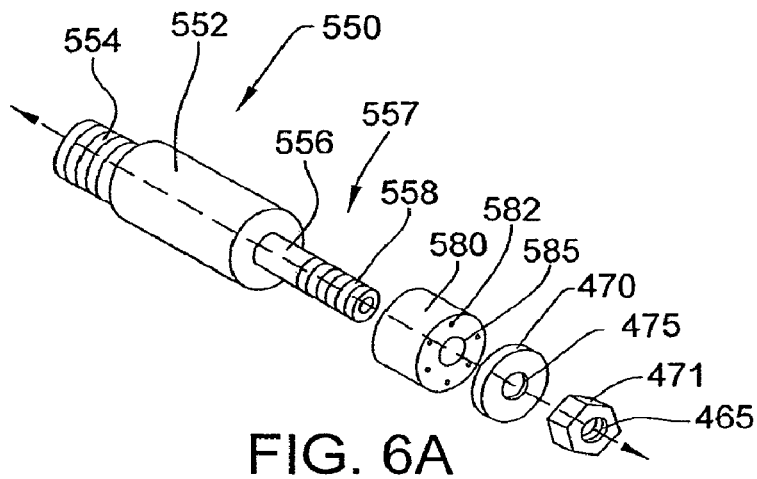
FIG. 6A is an isometric assembly view of a dowel assembly.
Figure 6B:
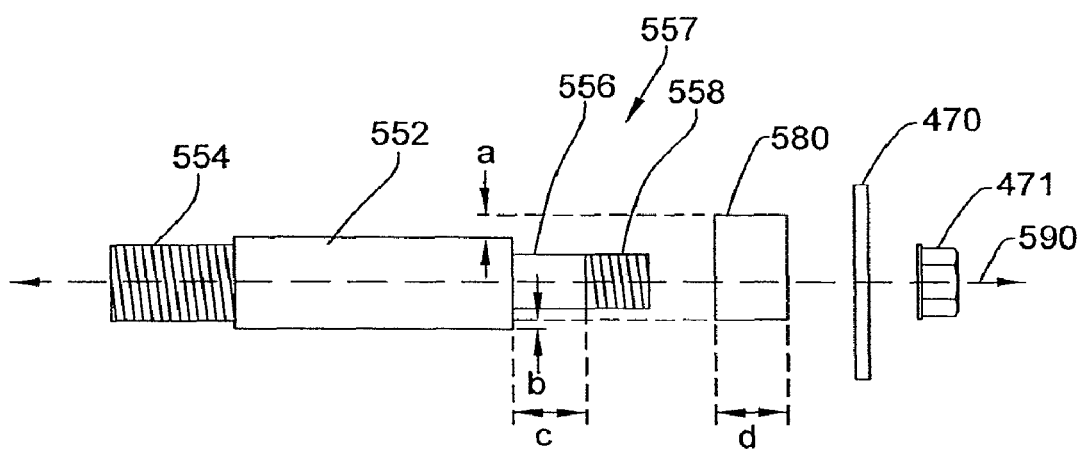
FIG. 6B is a side assembly view of a dowel assembly.

Referring to FIG. 6A and FIG. 6B, the dowel assembly 550 has a dowel body 551 disposed along a longitudinal axis 590 and includes a distal region 554 defining a securing end, an intermediate region 552 defining a dowel support body, and a proximal region 557. Compared with the intermediate region 552, the distal region 554 has a smaller radius with respect to the longitudinal axis 590 and the distal region 554 is threaded whereas the intermediate region 552 is unthreaded. Compared with the intermediate region 552, the proximal region 557 has a smaller radius with respect to the longitudinal axis 590. The proximal region 557 includes a threaded drawing portion 558 formed as a threaded shank as well as an unthreaded portion 556 defining a cam support shaft.

Also pictured are a cam 580, a washer 470, and a nut 471. The cam 580 features a non-uniform radius with respect to the longitudinal axis 590 of the dowel 550, a cam cavity or bore 585 having a radius slightly larger than that of the shaft 556 of the proximal region 557, and a plurality of drive indentations or bores 582 configured to facilitate rotating adjustment of the cam 580 about longitudinal axis 590. Put another way, the cam cavity 585 is positioned eccentrically from the outer geometry of the cam 580 and rotatably receives the shaft 556 therethrough.

Further, the washer 470 and nut 471 are adapted to be threadedly supported on the shank 558 for drawing the cabinet components together. The washer 470 features an outer radius measured from the longitudinal axis 590 as well as a washer cavity or bore 475 having a radius slightly larger than that of the proximal region 557. In addition, the nut 471 includes a hexagonal outer geometry to facilitate rotation of the nut 471 via hand tools such as a drive socket or wrench having a corresponding operative interface. The nut 471 also features a threaded nut cavity or bore 465 configured to facilitate threaded engagement between the nut 465 and the threaded shank portion 558 of the proximal region 557.

The dowel body 551 attaches to the additional elements such as cam 580, washer 470, and nut 471. For instance, the threaded portion 558 of the proximal region 557 enables attachment of at least one nut 471 to the dowel body 551 via the corresponding threaded nut cavity 465. Further, the proximal region 557 is provided with sufficient length to accommodate at least one washer 470 between the intermediate region 552 and the nut 471 and sufficient diameter to snugly attach to both the nut 471 and the one or more washers 470. As another example, the proximal region 557 enables attachment of at least one cam 580 to the dowel body 551 via the cam cavity 585. Additionally, the distal region 554 of the dowel body 551 is threaded to enable coupling of the dowel 550 via the distal region 554 to horizontal panel member 120.

As illustrated in FIG. 6B, a side assembly view of the dowel assembly 550, the eccentric nature of the cam 580 causes the maximum radius of the cam 580 to trace out a first circumference as the cam rotates about the longitudinal axis 590 and the minimum radius of the cam 580 to trace out a second smaller circumference during the same rotation. In other words, at its maximum, the radius of the cam 580 with respect to the longitudinal axis 590 is greater than the radius of the intermediate region 552 with respect to the longitudinal axis 590 by a distance "a". At its minimum, the radius of the cam 580 with respect to the longitudinal axis 590 of the dowel 550 is smaller than the radius of the intermediate region 552 with respect to the longitudinal axis 590 of the dowel 550 by a distance "b". Given the cylindrical nature of the cam 580, radii having infinite lengths between "a" and "b" may exist. In addition, the length "d" of the cam 580 may correspond to the length "c" of the unthreaded shaft region 556, for example, to facilitate rotation of the cam 580 about the unthreaded region 556.

Figure 9A:
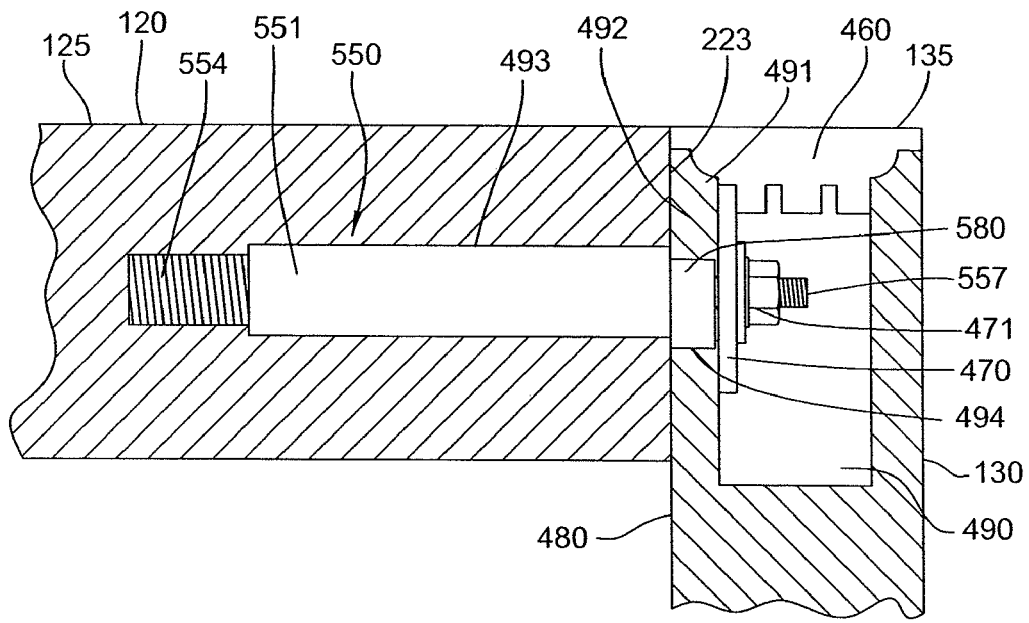
FIG. 9A and FIG. 9B are isometric views of a dowel assembly and a cam affixing components of a furniture system featuring a representation of the dowel disposed within one component of the furniture system and cooperating with the adjacent component.
Figure 9B:
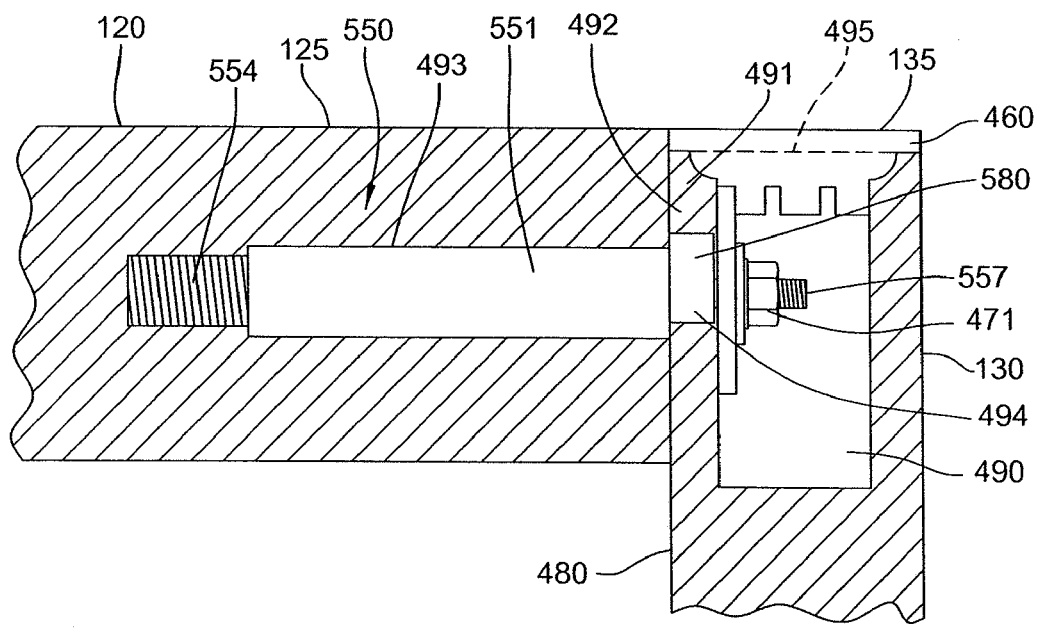

The dimensional relationship illustrated in FIG. 6A and FIG. 6B provide operational effects when used in conjunction with a furniture system. For example, as seen in FIGS. 9A and 9B the dowel body 551 is inserted into the horizontal member 120 and affixed via interaction, as by threading, between the distal region 554 and the dowel receiving bore 493 of the horizontal member 120. The dowel assembly 550 is also inserted into the vertical member 130 by abutting joining surface 223 of the horizontal member 120 against the inner surface 480 of the vertical member 130 such that the proximal portion 557 of the dowel body 551 extends into the recess 490 through the slot 491 and the cam 580 rests against the base or bottom end 494 of the slot 491 so as to carry the vertical weight of the horizontal member 120. Given the geometric properties of the cam 580, rotation of the cam 580 about the longitudinal axis 590 causes the dowel body 551, and thus the horizontal member 120, to be raised and lowered with respect to the base of the slot 491 in response to the instant thickness of the cam 580 contacting against the base 494 of the slot 491. Since the top cap 460 is removed during assembly, a spacer plate 495 (diagrammatically illustrated in FIG. 9B) or other guide would be placed next to the cam 580 to represent the top surface 135 and indicate when this top surface 135 would be flush to the top surface 125 when the top cap 460 is installed. When the horizontal member 120 achieves a desired position relative to the vertical member 130, e.g., the top surface 125 of the horizontal member 120 and the top surface 135 of the vertical member 130 would be substantially flush, rotation of the cam 580 is discontinued. The dowel assembly 550 is affixed against the interior wall 492 of the recess 490 via the washer 470 sized larger than the gap defining the slot 491 and the nut 471. The cam 580 is thinner than the slot 491 so that the side wall 492 is clamped between panel face 223 and washer 470. For designs featuring an end cap 460, the end cap is then attached to the vertical member 130.

Figure 7A:
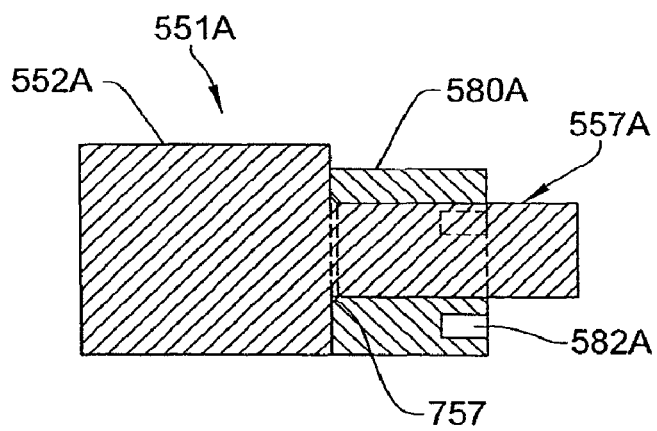
FIG. 7A and FIG. 7B are side cross-sectional and end views, respectively, of a dowel and cam assembly.
Figure 7B:
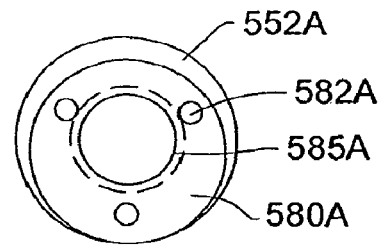

These operational effects may be achieved with various types of cam 580 as well as various types of dowel body 551, for example, the dowel body 551A and cam 580A featured in FIGS. 7A and 7B. These figures illustrate the cam 580A comprising three recesses 582A and the eccentrically located cam cavity 585A adjoining the proximal region 557A. Further, these figures show the cam 580A having a maximum radius substantially equal to that of the intermediate region 552A and having a minimum radius having a length less than the radius of the intermediate region 550A. Like above, the cam 580A is turned within the slot 232, for example, to accommodate the additional material left within the slot 232 due to wearing of the machine tool. In this way, the cam 580A may be dimensionally tailored to the demands of a particular furniture system design.

According to the invention, the dowel assembly 550 including the cam 580 featured in FIG. 8 is implemented to connect a horizontal member 120 with a vertical member 130. Specifically, the cam 580 is rotatably connected about the proximal region of the dowel assembly 550 and rotatably seated within the slot 491 of the vertical member 130 to carry the weight and load of the horizontal member 120. In the present embodiment, the cam 580 has a length measured along the longitudinal axis of the dowel 550 less than the width of the slot 491. Put another way, the cam fills in a lower portion of the slot 491. The length of the cam 580 measured along the longitudinal axis of the dowel assembly 550 and the radius of the cam 580 measured with respect to the longitudinal axis of the dowel 550 are tailored to the dimensional issues arising during manufacture. Furthermore, the dowel body 551 is selected according to similar dimensional constraints. For instance, if the vertical member 130 to be implemented features a recess 491 having specified dimensions, the proximal region of the dowel body 551 is tailored to extend into the recess 490 via the slot 491 to a specified degree. Similar issues relating to the dimensions of the depth of the recess 490, the width of the slot 232, and/or the interface between the end cap (not shown) and/or the end cap interface 233 dictate allowable dimensions for the nut 471 and the washer 470. Furthermore, the cam 580 features recesses 582 according to, for example, the properties of the cam material and the anticipated friction on the interface between the cam 580 and the slot 491.

Once assembled, the horizontal member 120 in FIG. 10 is joined laterally with the vertical member 130 via brackets 1010 at the corners. In this embodiment, the brackets 1010 secure along a horizontal panel interface 1023 of the horizontal member 120 and a vertical panel interface 1033 of the vertical member 130 at the junction between a horizontal bracket recess 1025 and a vertical bracket recess 1035. In this way, the position of the horizontal member 120 and the vertical member 130 are laterally aligned with respect to their respective bracket recesses 1025, 1035. Further, note that one or more horizontal member 120 may be joined with one or more the vertical member 130 via a support positioned below the horizontal member 120, for example, to reduce the tendency of the horizontal member 120 to bow under its weight.

Rotation of the cam 580, 580A about the dowel body 551, 551A may be aided with the use of tools such as those featured in FIGS. 11A-C and FIGS. 12A-C. For example, the tool 1105A featured in FIGS. 11A-C includes a plurality of protrusions 1110A connected to an arced flange 1125 and further connected to a handle 1120A. Said plurality of protrusions 1110A are arranged to secure snugly within the cam recesses 582, 582A of the cam 580, 580A so as to turn the cam 580, 580A about the longitudinal axis of the dowel body 551 and 551A without interfering with the proximal region 557 of the dowel body 551, 551A. In another embodiment, the tool 1105B illustrated in FIGS. 12A-C features a single protrusion 1110B connected to the distal end of a handle 1120B. Whereas the tool 1105A of FIGS. 11A-C is operated by inserting all protrusions 1110A within corresponding cam recesses 582, 582A and rotating the tool 1105A in a direction normal to the proximal side end of the handle 1120A, the tool 1105B of FIGS. 12A-C is operated by inserting the single protrusion 1110B within a single cam recess 582, 582A and pushing or pulling the tool 1105B via the handle 1120B in the direction of the length of the tool 1105. Issues such as stresses generated at the interface between the protrusion 1110A, 1110B and the cam recess 582, 582A may favor a particular tool design.

Figure 13:
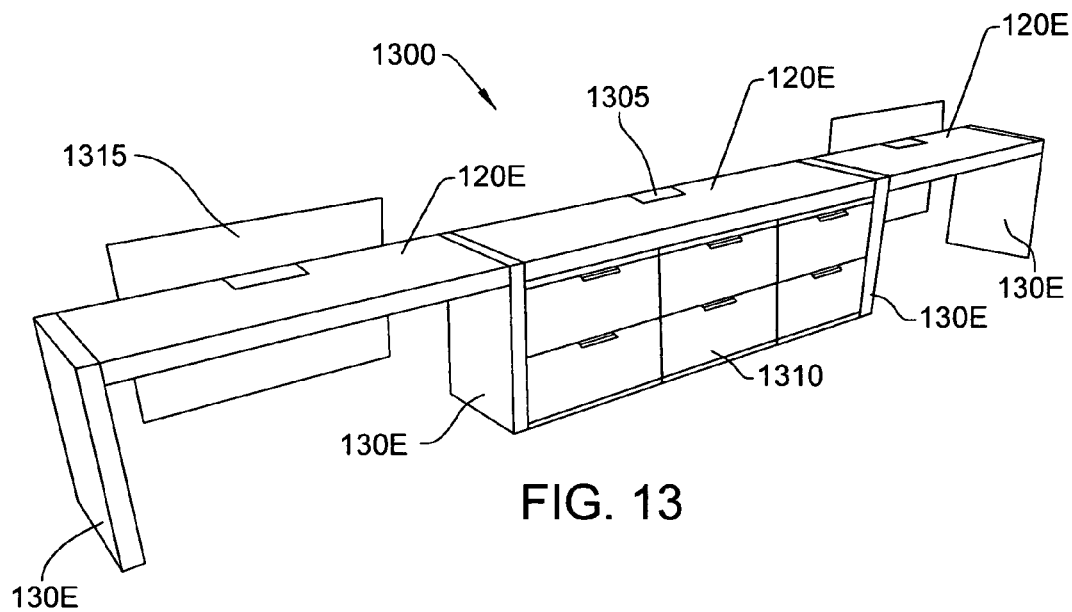
FIG. 13 is an isometric view of an alternative embodiment for a furniture system.
Figure 14:
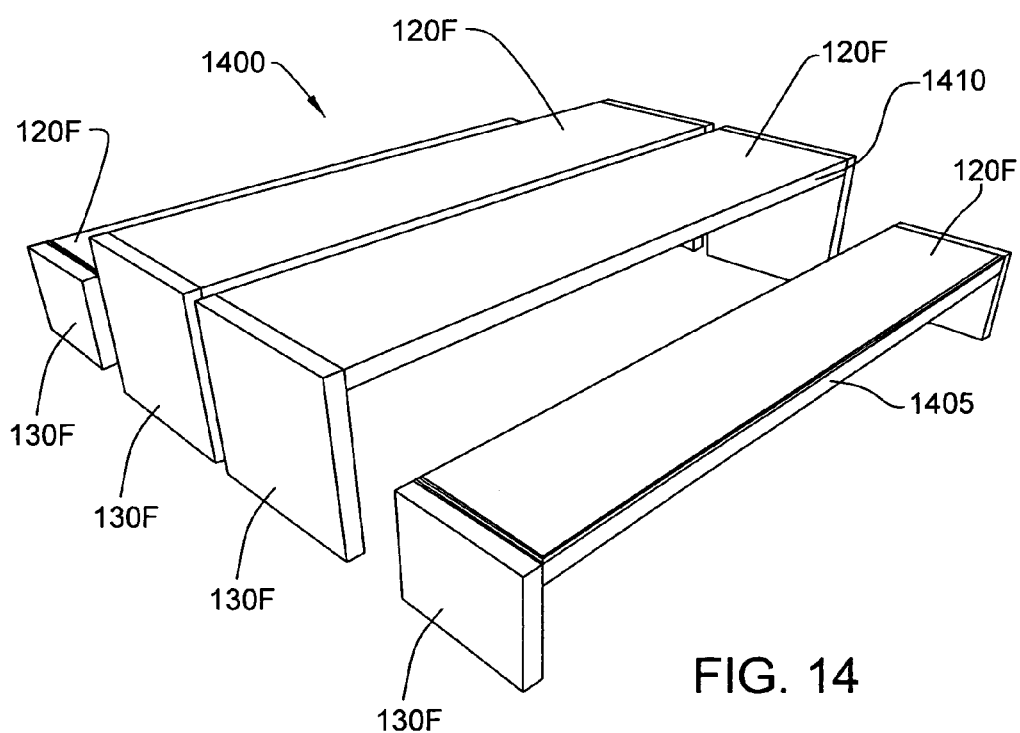
FIG. 14 is an isometric view of an additional alternative embodiment for a furniture system.
Figure 25:
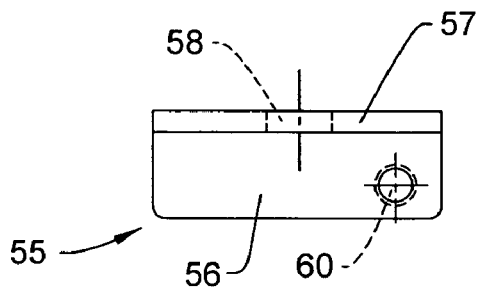
FIG. 25 is a top view of the adjustment bracket.
Figures 24, 26:
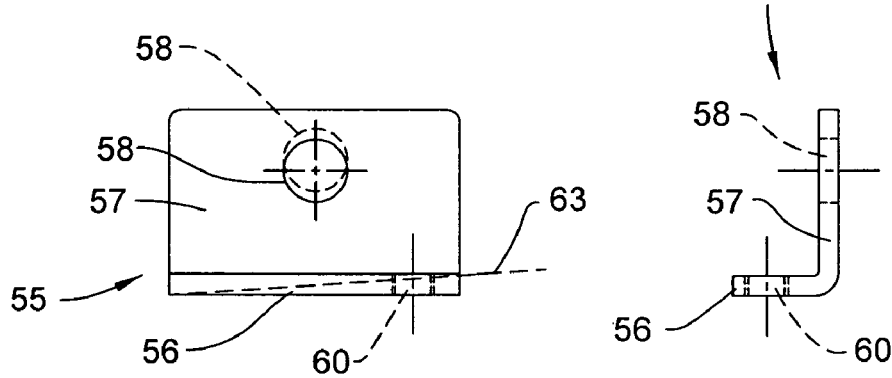
FIG. 24 is a side view of an L-shaped adjustment bracket.
FIG. 26 is an end view of the adjustment bracket.
Figure 22:
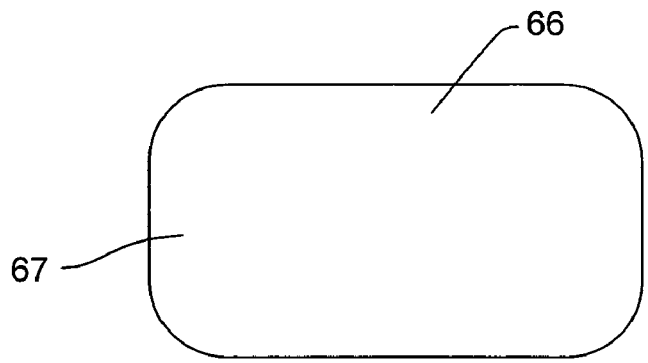
FIG. 22 is a top view of a base plate.
Figure 23:
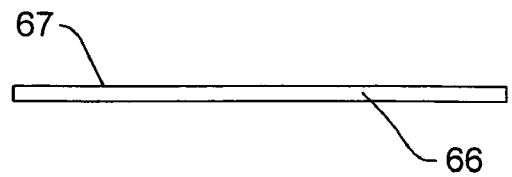
FIG. 23 is a side view of the base plate.

These and other concepts in accordance with the invention may be implemented to connect a variety of furniture systems such as the desk/storage cabinet combination 1300 featured in FIG. 13 and the desk/bench combination 1400 featured in FIG. 14. Referring to FIG. 13, multiple horizontal members 120E are coupled to multiple vertical members 130E while maintaining a substantially flush top surface. This embodiment features the use of caps along the tops and the sides of the vertical members 130E as well as caps along the exposed sides of the horizontal members 120E. Underneath these caps are the dowel assemblies 550, 550A according to the present invention. Through installation of these devices, a substantially flush top surface can be consistently achieved in combination a variety of modular features such as privacy screens 1315, technology 1305 like electrical and communications outlets, and cabinetry 1310. Referring to FIG. 14, dowel assemblies 550, 550A according to the present invention may be implemented within variable loading structures such as benches 1405 as well as other structures like desks 1410. This embodiment features the use of caps along the tops and the sides of the vertical members 130F as well as caps along the exposed sides of the horizontal members 120F. As these examples illustrate, the dowel assembly of the invention may be implemented in a wide variety of furniture systems to improve aspects such as cost, appearance, and modularity.

Referring to FIGS. 15-26, a further embodiment of a dowel assembly 550-1 (FIG. 15) has a dowel body 551-1 disposed along a longitudinal axis 590-1 (FIGS. 19-20). The dowel body 551-1 includes a threaded distal region 554-1 defining a securing end for securing to the horizontal furniture panel 120 wherein the outer diameter of the threads generally correspond to the diameter of the dowel receiving bore 493 so as to threadedly engage therewith along the length thereof. A hexagonal drive section 51 is provided for rotatable driving of the dowel body 551-1 into the bore 493 by a suitable tool such as a wrench or the like. Axially adjacent thereto, a stop flange 52 is provided which abuts against the end face of the panel 120 to define the fully seated position for the dowel body 551-1 when engaged in the bore 493.

The dowel body 551-1 further includes an end shaft which projects outwardly and defines a proximal region 557-1. The proximal region 557-1 narrows slightly to a threaded drawing portion 558-1 formed as a threaded shank and also serving as a support shaft which carries the vertical weight or load of the horizontal panel 120 as seen in FIG. 15. The threaded drawing portion 558-1 receives a nut 471-1 (FIGS. 15 and 16) thereon.

To cause raising and lowering of the panel 120 relative to the vertical panel 130, the drawing portion 558-1 is engaged with and vertically supported by an L-shaped support bracket or member 55 which is located in the recess 237 formed in panel 130 as seen in FIG. 15. The support bracket 55 (FIGS. 24-26) has a horizontal base leg 56 which is configured to sit on the floor or bottom of the recess 237. The support bracket 55 also has an upstanding support leg 57 with a hole 58 through which the dowel drawing portion 558-1 extends as seen in FIG. 15.

The base leg 56 includes a threaded bore 60 which opens vertically and receives and adjustment screw or other adjustment member 61 (FIGS. 15, 17 and 18) which is preferably formed as a set screw. The screw 61 can be driven downwardly when located in the recess 237 so as to engage the bottom of the recess and lift the right side of the bracket 55 upwardly as indicated by inclination line 63 in FIG. 24. This will effect tilting of the bracket 55, i.e., the bracket rotates slightly about the shaft 558-1, which due to the bracket reacting against the bottom wall raises the vertical elevation of the hole 58 relative to the bottom of the recess 237. By moving the hole 58 upwardly, as indicated in phantom outline in FIG. 24, the dowel body 551-1 will in turn be raised which causes a corresponding lifting of the horizontal panel 120. This thereby allows for precise adjustment of contiguous top surfaces of the panels 120 and 130 in a similar manner to the first embodiment described above which uses a rotatable eccentric cam.

To protect the bottom of the recess, a base plate 66 (FIGS. 15, 22 and 23) is first placed in the recess. The protective plate 66 preferably is formed of metal or other suitable, hard material which defines a top surface 67 that can be contacted by the bottom end of the set screw 61. Hence, downward driving of the set screw 61 by a tool which engages the hex socket 61A causes raising of the horizontal furniture panel 120 while reversing the set screw 61 will lower the panel 120 to allow for precise alignment of the contiguous top panel surfaces.

Once aligned, the nut 471-1 is tightened to draw the vertical bracket leg 57 tightly against the recess wall 239 which performs the additional function of drawing the panels 120 and 130 together and clamping same in position.

Although a number of particular embodiments of the invention have been disclosed in detail for illustrative purposes, it will be recognized that variations or modifications of the disclosed apparatus, including rearrangement of parts, lie within the scope of the present invention.

What is claimed is:

1. In a furniture article comprising a first furniture component and an adjoining second furniture component interconnected together at a joint wherein said first and second furniture components have respective first and second component surfaces disposed contiguous to each other at said joint, the joint comprising a dowel assembly connectable between said first and second furniture components for joining thereof at said joint, said dowel assembly comprising a dowel body fixedly connected to said first furniture component, the dowel body including a support shaft projecting outwardly from said first furniture component into a dowel recess adjoining a slot formed in an end surface of said second furniture component, said dowel assembly including a cam rotatably supported on said support shaft and seated within said slot, said cam having a circumferential cam surface with a non-uniform radius with respect to a longitudinal axis of said support shaft such that the radial distance of said cam surface from said longitudinal axis varies circumferentially along said cam surface, said cam surface engaging an opposed surface within said slot in said second furniture component, said dowel assembly spanning the interface between said adjoining first and second furniture components, and said cam being selectively manually rotatable with respect to said support shaft to selectively adjust a position of contact between said cam surface and said opposed surface to cause a position of one of said first and second furniture components to move relative to the other of said first and second furniture components to effect alignment of said contiguous first and second component surfaces, said support shaft having a shaft end part which projects beyond said cam into said recess in said second furniture component and having fastener formations thereon, a plate member supported on the shaft end part adjacent the cam, and a fastener engaged with the fastener formations to press the plate member against a surface within said recess in the second furniture component to draw said first and second furniture components together so that the dowel assembly serves a joining function.

2. The furniture article according to claim 1, wherein said furniture article is a cabinet, and said first and second furniture components comprise a horizontal cabinet panel and a vertical cabinet panel.

3. The furniture article according to claim 2, wherein said dowel assembly carries the weight of the horizontal cabinet panel.

4. The furniture article according to claim 1, wherein an opposite end of the support shaft has a fastener formation which fixedly threadingly engages said first furniture component.

5. A furniture article including first and second furniture components rigidly connected together by a horizontally-extending dowel assembly, said dowel assembly comprising:
an elongate dowel body having a center body part, an externally threaded first shaft part cantilevered outwardly from one end surface of said center body part and adapted to be threaded into a bore formed in said first furniture component, and a second shaft part cantilevered outwardly from another end surface of said center body part, said first and second shaft parts being co-axially aligned about a shaft axis, and said second shaft part having an externally threaded end portion adjacent a free end thereof;
a cam rotatably supported on and encircling said second shaft part adjacent said another end surface, said cam defining an encircling exterior cam surface having a variable radius relative to the shaft axis of said second shaft part, said cam surface being seated against an opposed surface defined within a slot adjoining a recess formed in an end surface of said second furniture component, said cam being selectively rotatable on the second shaft part to vary contact of the cam with said opposed surface to adjust a transverse distance between said shaft axis and said opposed surface; and a nut arrangement threadedly engaged on the threaded end portion of said second shaft part for pressing engagement with a surface within said recess in said second furniture component while tensioning said elongate dowel body so as to pull said first and second furniture components into snug engaging contact with one another.

6. A furniture assembly according to claim 5, wherein said cam comprises a cylinder having said cam surface defined on an exterior periphery thereof, said cylinder being eccentrically rotatably supported on said second shaft part.

7. A furniture assembly according to claim 5, wherein said bore for accommodating said first shaft part extends horizontally and opens outwardly through an end face of said first furniture component, wherein said recess in said second furniture component extends vertically downwardly thereof for accommodating said nut arrangement, wherein said slot in said second furniture component opens horizontally from said recess through an end face of said second furniture component which is adapted to abut the end face on said first furniture component, said slot accommodating said cam therein, said slot terminating in a bottom surface disposed for contacting engagement with the cam surface on said cam, whereby rotation of the cam about the second shaft part varies a contact area of engagement on the cam surface with the bottom surface to permit the second furniture component to be vertically adjusted relative to the first furniture component.

8. A furniture assembly according to claim 7, wherein said nut arrangement includes a nut threaded onto said second shaft part and a radially enlarged washer which encircles the second shaft part axially between the cam and the nut and which is pressed against the surface of the recess to draw the end faces of the first and second furniture components together.

9. A furniture assembly according to claim 5, wherein the first furniture component comprises a generally horizontally enlarged top member having a generally horizontal top surface, said bore being located adjacent but downwardly from said top surface for opening outwardly through an end surface of the first furniture component;

said second furniture component comprising an upright member having an upper part positioned adjacent the end surface of said top member, said upper part having said recess formed therein and said slot opening downwardly thereof from an upper end thereof, said upper end part mounting a top cap having a flat top surface which can be positioned flush with the top surface on said top member by rotation of said cam so as to vary its seating contact with the bottom surface of said slot.

10. A furniture assembly comprising a first horizontally-extending furniture component having an end part positioned directly adjacent an upper part of a second load-bearing upright furniture component, and a dowel assembly connected horizontally between the end and upper parts of said first and second furniture components, respectively, said first and second furniture components having respective generally horizontal top surfaces disposed contiguous to one another;

said dowel assembly including a horizontally elongate dowel body having a radially-enlarged center section joined between first and second co-axial shaft parts which cantilever outwardly in opposite directions from said center section and are aligned about a shaft axis, said first shaft part being externally threaded and threadedly engaged within a horizontal bore formed in the end part of said first furniture component to fixedly join said dowel body thereto, said second shaft part being externally threaded at least adjacent a free end thereof and projecting into an open region defined by a recess formed in an end surface of the upper part of said second furniture component;

an adjustment member encircling said second shaft part within a slot adjoining said recess, said adjustment member projecting downwardly from said second shaft part and having a lower peripheral surface disposed in contacting engagement with a bottom wall of said slot for defining a transverse distance between said axis and said bottom wall, the adjustment member being manually positionably adjustable relative to said second shaft part to vary said transverse distance so as to horizontally align the horizontal top surfaces on said first and second furniture components; and a fastener arrangement threadedly engaged on the second shaft part adjacent the free end thereof for pressing engagement with a surface within said recess so that tightening of the fastener on the second shaft part effects tensioning of the dowel body to cause the end and upper parts of the respective first and second furniture components to be drawn tightly together in fixed relationship.

11. A furniture article according to claim 10, wherein said adjustment member comprises a cam which rotatably encircles said second shaft part and has an eccentric peripheral cam surface which at a lower part thereof, defines the contacting engagement with the bottom wall.

12. A furniture article according to claim 10, wherein said adjustment member comprises a plate which rotatably encircles said second shaft part and has a lower plate portion which projects downwardly toward the bottom wall and which terminates in a lower plate part which defines said contacting engagement with said bottom wall, said lower plate part including a positionably adjustable part which is manually adjustable to vary the transverse distance between the shaft axis and the bottom wall.

* * * * *

UNITED STATES PATENT AND TRADEMARK OFFICE
CERTIFICATE OF CORRECTION

PATENT NO. : 8,092,112 B2
APPLICATION NO. : 12/317076
DATED : January 10, 2012
INVENTOR(S) : Randall Borgman et al.

It is certified that error appears in the above-identified patent and that said Letters Patent is hereby corrected as shown below:

Column 12, line 2: replace "contact with the bottom" to

--contact with a bottom--.

Signed and Sealed this
Thirteenth Day of March, 2012

David J. Kappos
*Director of the United States Patent and Trademark Office*